(12) United States Patent
Muroyama

(10) Patent No.: US 8,327,041 B2
(45) Date of Patent: Dec. 4, 2012

(54) STORAGE DEVICE AND DATA TRANSFER METHOD FOR THE SAME

(75) Inventor: Tomohiko Muroyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 44 days.

(21) Appl. No.: 12/690,158

(22) Filed: Jan. 20, 2010

(65) Prior Publication Data

US 2010/0185793 A1 Jul. 22, 2010

(30) Foreign Application Priority Data

Jan. 22, 2009 (JP) .................................. 2009-11622

(51) Int. Cl.
*G06F 13/00* (2006.01)
*G06F 13/12* (2006.01)
(52) U.S. Cl. ............................... 710/34; 710/62; 710/72
(58) Field of Classification Search .................. 710/34, 710/62, 72
See application file for complete search history.

(56) References Cited

U.S. PATENT DOCUMENTS

| | | | | |
|---|---|---|---|---|
| 6,343,342 | B1 * | 1/2002 | Carlson ........................ | 711/112 |
| 6,519,678 | B1 * | 2/2003 | Basham et al. ............... | 711/112 |
| 6,557,073 | B1 * | 4/2003 | Fujiwara et al. ............. | 711/111 |
| 6,742,084 | B1 * | 5/2004 | Defouw et al. ............... | 711/133 |
| 7,039,657 | B1 * | 5/2006 | Bish et al. .............................. | 1/1 |
| 2008/0077758 | A1 * | 3/2008 | Ohmido ........................ | 711/162 |

FOREIGN PATENT DOCUMENTS

| | | |
|---|---|---|
| JP | 1991-226850 | 10/1991 |
| JP | 4-259048 A | 9/1992 |
| JP | 2000-20247 | 1/2000 |
| JP | 2006-287293 | 10/2006 |
| JP | 2007-102436 | 4/2007 |
| JP | 2008-310885 | 12/2008 |

OTHER PUBLICATIONS

"Japanese Office Action" mailed by JPO and corresponding to Japanese application No. 2009-011622 on Dec. 21, 2010, with partial English translation.
Japanese Office Action mailed Oct. 4, 2011 for corresponding Japanese Application No. 2009-011622, with Partial English-language Translation.

* cited by examiner

*Primary Examiner* — Chun-Kuan Lee
*Assistant Examiner* — David Martinez
(74) *Attorney, Agent, or Firm* — Fujitsu Patent Center

(57) ABSTRACT

A storage device is connected to a tape library having a plurality of tapes holding data and a host device. The storage device includes a receiving section, a first determining section and a reading section. The receiving section receives a request for data held in one of the tapes from the host device. The first determining section determines whether the data requested by the host device is stored in a storage section on the basis of the request received by the receiving section. The reading section reads the data in a predetermined amount to a memory from the tape in a case where the first determining section determines that the data is not stored in the storage section. The transferring section transfers the data in the memory to the host device and writes it on the storage section.

13 Claims, 10 Drawing Sheets

| SIZE | 50G | 100G | 150G | 200G | 250G | 300G | 350G | 400G |
|---|---|---|---|---|---|---|---|---|
| PERCENTAGE | 5.0 % | 4.5 % | 4.0 % | 3.5 % | 3.0 % | 2.5 % | 2.0 % | 1.5 % |

000# STORAGE DEVICE AND DATA TRANSFER METHOD FOR THE SAME

CROSS-REFERENCE TO RELATED APPLICATIONS

This application is based upon and claims the benefit of priority of the prior Japanese Patent Application No. 2009-11622, filed on Jan. 22, 2009, the entire contents of which are incorporated herein by reference.

FIELD

The embodiment(s) discussed herein relate to a storage device that can be connected to a tape library and a host device. The tape library includes a plurality of tapes holding data. Embodiment(s) discussed herein also relate to a data transfer method for the storage device.

BACKGROUND

A virtual tape library device that virtually performs a tape operation on a disk and that holds image data (hereinafter referred to as data) on a physical tape contained in a tape library on a disk array as logical volume (LV) has been researched. Such a virtual tape library device does not require mechanical operations, e.g., conventional tape mounting or load/unload, so that high-speed processing can be realized. This virtual tape library device includes a hierarchical control server that controls data or the like between a host and a tape library. When receiving a data read/write request from the host, the virtual tape library device behaves as a tape library and reads/writes data by using a disk array.

As described above, the virtual tape library device responds to the host by using a disk array device having a high data access speed, and thus enables higher-speed processing than a system using only a conventional tape library. After responding to the host, the virtual tape library device stores data written on the disk array device on a tape in the background without communicating with the host. This is called a migration process.

In the virtual tape library device, update of data is not frequently performed and large-volume data that has been migrated is erased from the disk array device in order to prevent the space in the disk array device from being insufficient due to the data written thereon. In a case where data requested by the host is "on cache", existing on the disk array device, the virtual tape library device reads the data from the disk array device and responds to the host. On the other hand, in a case of "cache miss" where data for a read/write response to the host does not exist on the disk array device, the virtual tape library device reads migrated data that is stored on a tape contained in the tape library. After writing the read data on the disk array device, the virtual tape library device responds to the host by using the data on the disk array device.

According to a related art, a plurality of buffer memories are provided on a transmitter side. For example, Japanese Unexamined Patent Application Publication No. 2006-287293 discloses a technique of generating a pseudo response immediately after data transfer from the buffer memories and enabling storage of other data to be transferred in a case where the buffer memories have a free space.

In a tape library connected to an open-type host, the volume of data written from the host is expanded compared to that in a main-frame type, and thus data that is not frequently updated after a migration process is erased from a disk array. This increases, however, the possibility that a cache-miss state occurs. As described above, the conventional virtual tape library device transfers data to the host after migrating the data to the disk array device. Therefore, conventionally, a processing time is disadvantageously long in a case where large-volume data is to be handled on the host side. Accordingly, in the case where large-volume data is to be handled on the host side, time for responding to the host becomes longer in a system including the virtual tape library compared to a system including only an ordinary tape library.

SUMMARY

According to an aspect of the invention, a storage device is provided which is configured to be connected to a tape library and a host device. The tape library includes a plurality of tapes holding data. The storage device includes a receiving section, a first determining section and a reading section. The receiving section receives a request for data held in one of the tapes from the host device. The first determining section determines whether the data requested by the host device is stored in a storage section on the basis of the request received by the receiving section. The reading section reads the requested data in a predetermined amount to a memory from the tape holding the requested data in a case where the first determining section determines that the requested data is not stored in the storage section. The transferring section transfers, to the host device, the data read to the memory by the reading section while writing, on the storage section, the data read to the memory by the reading section.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

DESCRIPTION OF EMBODIMENTS

Hereinafter, embodiments will be described with reference to the attached drawings.

First Embodiment

A configuration of a virtual tape library system according to a first embodiment will be described with reference to FIGS. 1 and 2.

Figure 1:
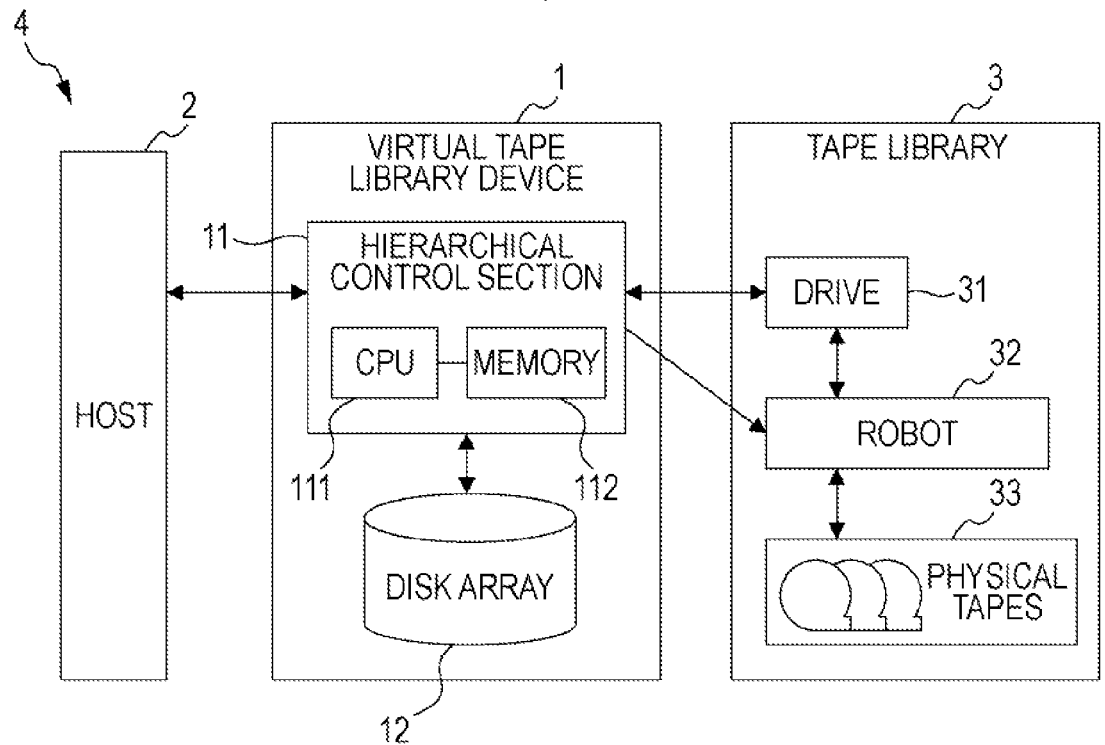
FIG. 1 is a block diagram illustrating an example of a configuration of a virtual tape library system according to a first embodiment.

FIG. 1 is a block diagram illustrating an example of the configuration of the virtual tape library system according to the first embodiment. As illustrated in FIG. 1, the virtual tape library system 4 includes a virtual tape library device 1, a host 2, and a tape library 3. The solid-line arrows illustrated in FIG. 1 indicate a control flow.

The virtual tape library device 1 includes a hierarchical control section 11 and a disk array 12. The hierarchical control section 11 includes a CPU (Central Processing Unit) 111 and a memory 112. The hierarchical control section 11 reads/writes data from/on the tape library 3 and the disk array 12 on the basis of a read/write request from the host 2.

The CPU 111 controls the operation of the above-described hierarchical control section 11. The memory 112 is a non-volatile storage area to which data on a physical tape or statistical information and a threshold (described below) are temporarily read. For example, the data is constituted in units of blocks and is read onto the memory 112 in units of blocks.

The disk array 12 is formed of a RAID (Redundant Array of Inexpensive Disks) and is a magnetic disk device from/on which data can be read/written. Also, the disk array 12 stores an information database of data written on a plurality of physical tapes 33 contained in the tape library 3.

The host 2 may be operated by a user and provides instructions to read/write data to the virtual tape library device 1. The tape library 3 includes a drive 31, a robot 32, and the plurality of physical tapes 33. The drive 31 reads data written on the physical tape 33 that is mounted thereon and transfers the data to the hierarchical control section 11. Also, the drive 31 writes data transferred from the hierarchical control section 11 on the physical tape 33. The robot 32 mounts the physical tape 33 on the drive 31 in response to instructions from the hierarchical control section 11 and unmounts the physical tape 33 mounted on the drive 31. Each of the physical tapes 33 is a nonvolatile storage medium from/on which data can be read/written.

Figure 2:
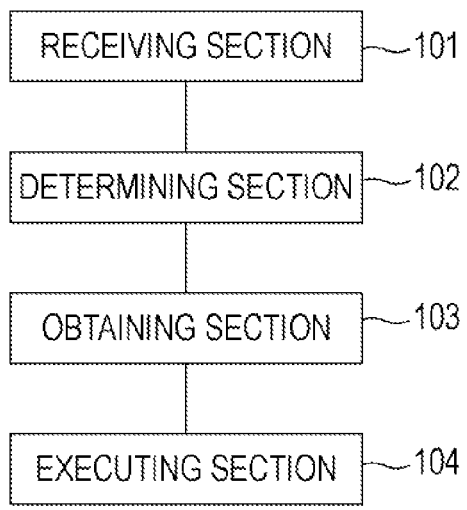
FIG. 2 illustrates an example of functional blocks in a hierarchical control section according to the first embodiment.

FIG. 2 illustrates an example of functional blocks in the hierarchical control section 11 according to this embodiment. As illustrated in FIG. 2, the hierarchical control section 11 includes a receiving section 101 (a receiving section and a request receiving section), a determining section 102 (a first determining section, a second determining section, a third determining section, a fourth determining section, and a unit determining section), an obtaining section 103 (a volume information obtaining section), and an executing section 104 (a reading section, a transferring section, a unit reading section, a unit writing section, a unit transferring section, and a responding section). The receiving section 101 receives a data request from the host 2. The determining section 102 determines whether data requested by the host 2 is stored in the disk array 12 and also determines whether the volume of data to be transferred to the host 2 is equal to or larger than a threshold. The threshold may be a preset threshold and will be described below.

The obtaining section 103 obtains volume information indicating the volume of data requested by the host 2 from the host 2. The executing section 104 instructs the robot 32 to mount the physical tape 33 on the drive 31 or to unmount the physical tape 33, and also reads data on the physical tape 33 mounted on the drive 31 in units of blocks. Also, the executing section 104 performs a simultaneous writing the blocks on the memory 112 onto the disk array 12 and transferring the blocks on the memory 112 to the host 2 after transfer process of reading data from the physical tape 33 to the memory 112 in units of blocks.

The respective functional blocks described above are realized when the CPU 111 reads a program stored in the disk array 12 and performs an operation by using the memory 112.

Next, an operation of the virtual tape library device 1 according to this embodiment will be described.

Figure 3:
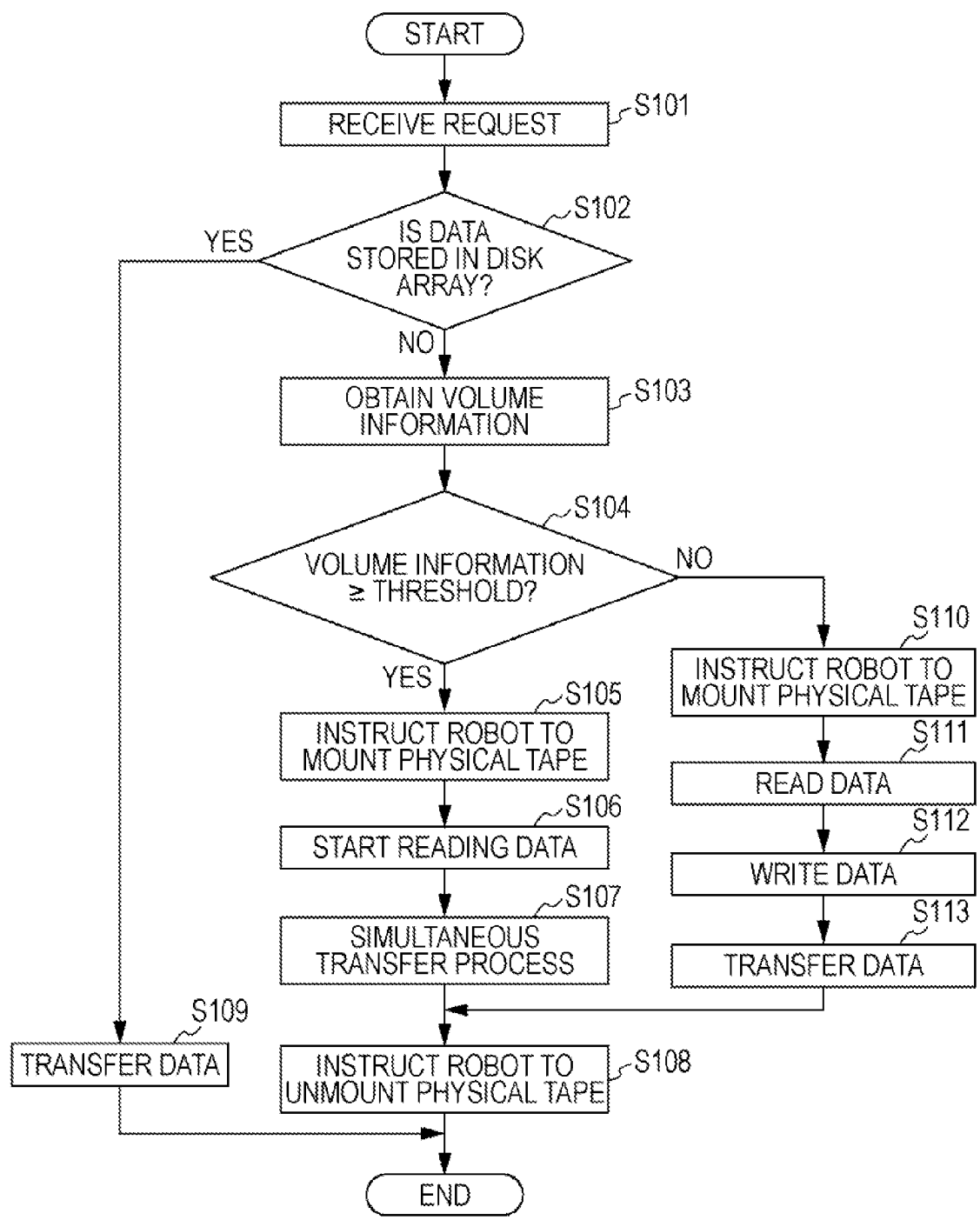
FIG. 3 is a flowchart illustrating an example of an operation of a data transfer process performed in a virtual tape library device according to the first embodiment.

FIG. 3 is a flowchart illustrating an example of an operation of a data transfer process performed in the virtual tape library device 1 according to this embodiment. First, the receiving section 101 receives a data request from the host 2 (S101, a receiving procedure), and the determining section 102 determines whether the requested data is stored in the disk array 12 (S102, a first determining procedure). In a case where the requested data is not stored (NO in S102, the first determining procedure), the obtaining section 103 obtains volume information of the requested data from the host 2 (S103, a volume information obtaining procedure). The determining section 102 determines whether the volume information obtained by the obtaining section 103 is equal to or larger than a threshold (S104, a second determining procedure). The threshold can be appropriately set in accordance with the performance of the drive 31 or an interface or the like between the virtual tape library device 1 and the tape library 3. In a case where the volume information is equal to or larger than the threshold (YES in S104, the second determining procedure), the executing section 104 instructs the robot 32 to mount the physical tape 33 that stores the requested data on the drive 31 (S105).

The robot 32 mounts the physical tape 33 on the drive 31. The executing section 104 reads the requested data from the drive 31 to the memory 112 in units of blocks (S106, a reading procedure). After reading a block, the executing section 104 writes the block on the memory 112 onto the disk array 12 and also transfers the block on the memory 112 to the host 2. This operation is repeated until all the blocks have been transferred (S107, a transferring procedure). The executing section 104 may sequentially erase the blocks that have been transferred to the host 2 from the memory 112. After transferring and writing the data, the executing section 104 instructs the robot 32 to unmount the physical tape 33 (S108), and this flow ends.

In a case where it is determined in the first determining procedure S102 that the requested data is stored in the disk array 12 (YES in S102, the first determining procedure), the executing section 104 reads the requested data stored in the disk array 12 and transfers the requested data to the host 2 (S109), and this flow ends.

In a case where it is determined in the second determining procedure S104 that the volume of the requested data is smaller than the threshold (NO in S104, the second determining procedure), the executing section 104 instructs the robot 32 to mount the physical tape 33 that stores the requested data on the drive 31 (S110). Accordingly, the robot 32 mounts the physical tape 33 on the drive 31, and the executing section 104 starts reading the requested data from the drive 31 to the memory 112 (S111). The executing section 104 writes blocks of the requested data read to the memory 112 onto the disk array 12 in the reading order (S112). The executing section 104 transfers the requested data written on the disk array 12 to the host 2 (S113). After transferring the data, the executing section 104 provides instructions to unmount the physical tape 33 (S108), and this flow ends.

In this embodiment, a threshold is provided and a simultaneous transfer process is performed on data having a volume that is equal to or larger than the threshold. However, the present invention is not limited to this embodiment. For example, the above-described simultaneous transfer process may be performed at the time when reading is requested from the host 2 and when it is determined that the requested data is not stored in the disk array 12.

According to this embodiment, a predetermined threshold is set, and the simultaneous transfer process is performed when it is determined that the requested data has a volume that is equal to or larger than the threshold. Accordingly, a response to a data request from the host 2 can be quickly transmitted, and delay of data transfer can be suppressed.

Second Embodiment

In the above-described first embodiment, data transfer is performed in a state where the data requested by the host 2 is written on the physical tape 33. However, it is possible that the requested data is dual-saved. Here, "dual-saved" means that the same data is stored in both of two physical tapes 33. In the virtual tape library device according to the second embodiment, in a case where data is dual-saved, one of the two physical tapes 33 is used for writing the data on the disk array 12 and the other is used for transferring the data to the host 2.

First, a configuration of a virtual tape library system according to this embodiment will be described. In the virtual tape library system according to this embodiment, the elements except the host 2 and the disk array 12 are redundantly provided in a dual structure. The elements of the dual structure are denoted by reference numerals with A and B, and a description thereof will be given. In this embodiment, the elements denoted by the same reference numerals as those in the first embodiment are elements that are the same as or equivalent to those in the first embodiment. Thus, a second description of the elements, which are the same as the previously described embodiment(s) will be omitted.

Figure 4:
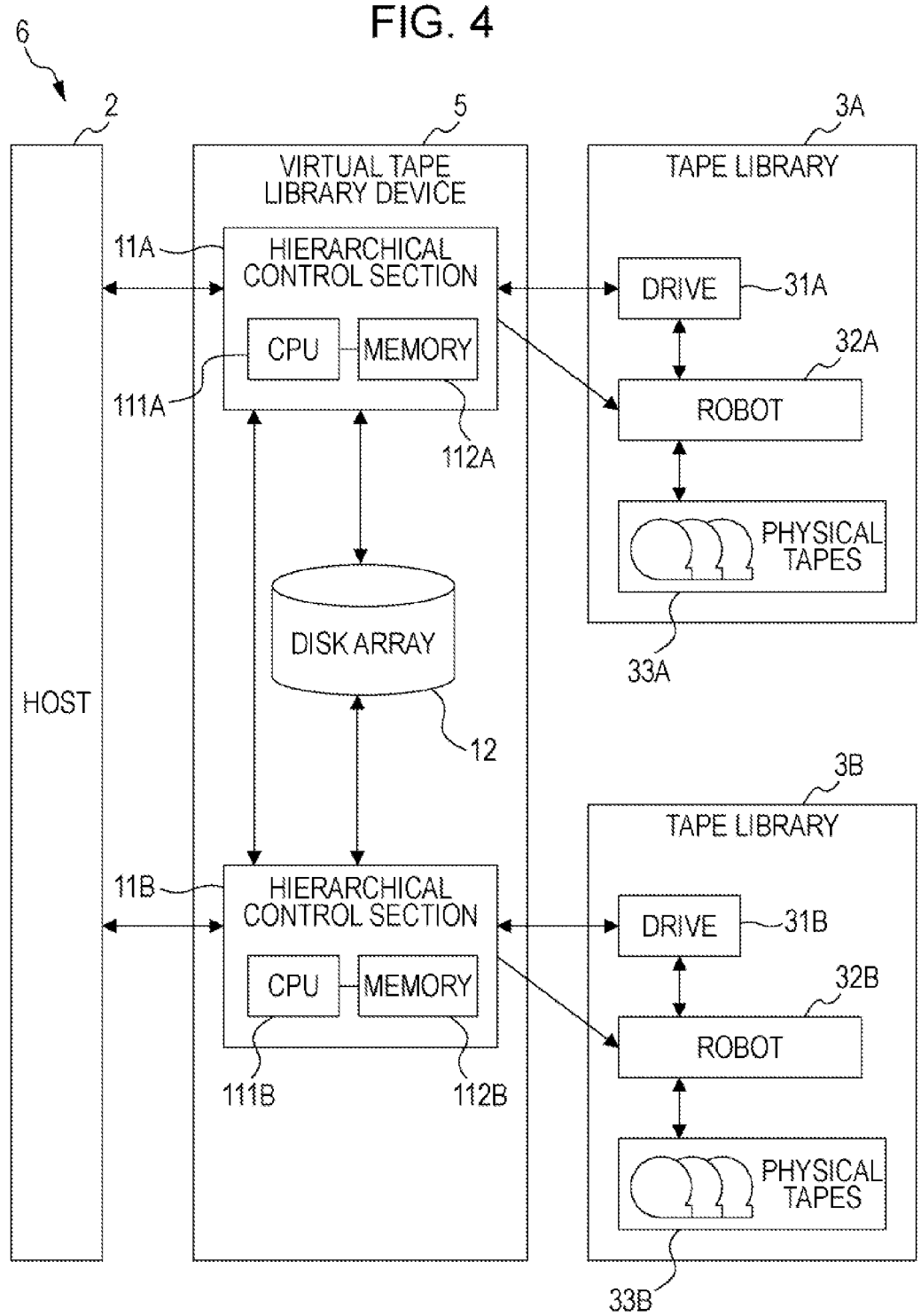
FIG. 4 is a block diagram illustrating an example of a configuration of a virtual tape library system according to a second embodiment.

FIG. 4 is a block diagram illustrating an example of a configuration of the virtual tape library system according to this embodiment. As illustrated in FIG. 4, the virtual tape library system 6 includes a virtual tape library device 5, the host 2, and tape libraries 3A and 3B. The virtual tape library device 5 is different from the virtual tape library device 1 illustrated in FIG. 1 in that hierarchical control sections 11A and 11B of a dual structure are provided instead of the hierarchical control section 11. The hierarchical control section 11A is connected to a drive 31A and a robot 32A, whereas the hierarchical control section 11B is connected to a drive 31B and a robot 32B. The solid-line arrows illustrated in FIG. 4 indicate a control flow.

The functional blocks according to this embodiment are different from those of the first embodiment in that the determining section 102 further determines whether requested data is stored in each of two physical tapes 33A and 33B. Another point different from the first embodiment is that, in a case where the determining section 102 determines that requested data is stored in each of the physical tapes 33A and 33B, the executing section 104 transfers any one of pieces of requested data read from the physical tapes 33A and 33B to the host 2 and writes the other piece on the disk array 12.

Figure 5:
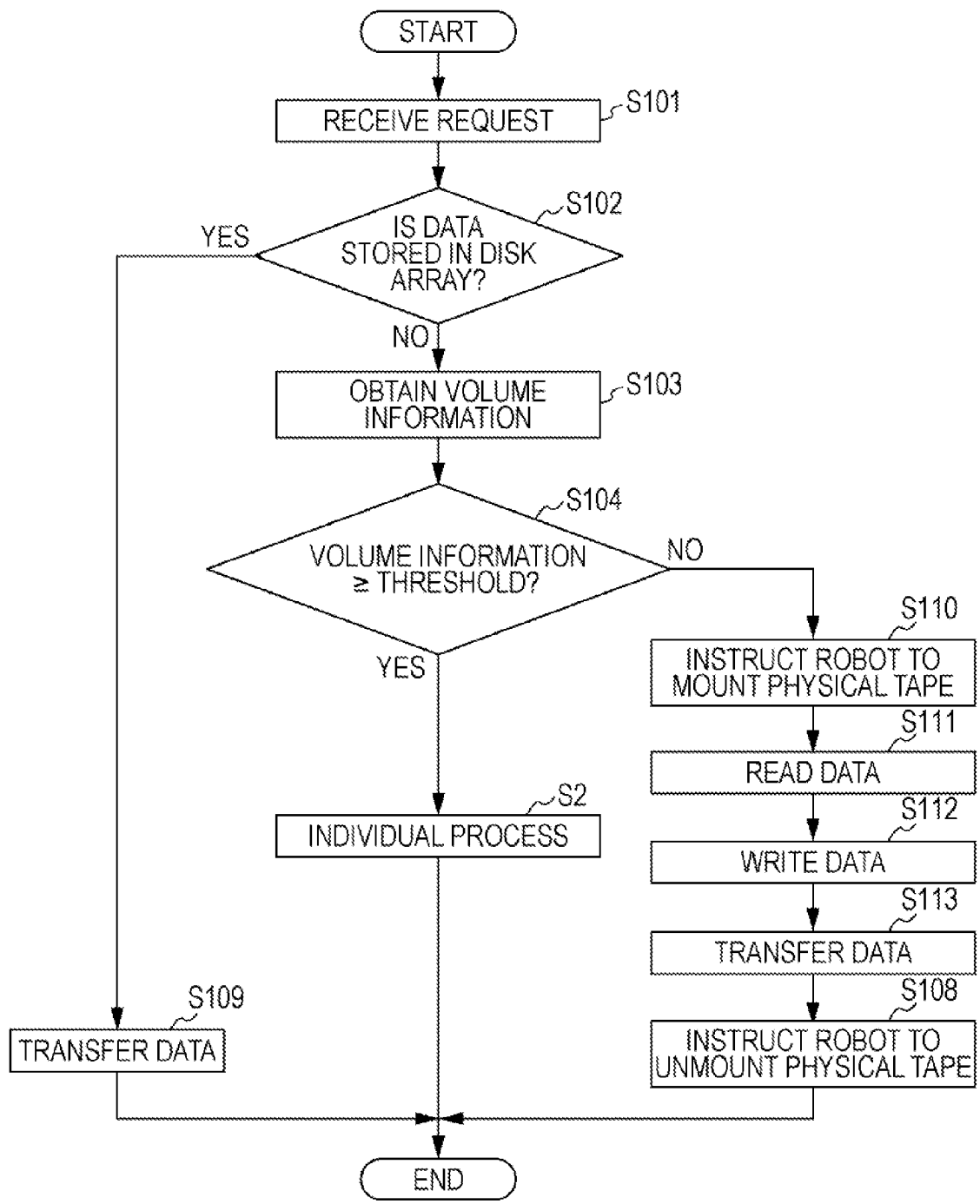
FIG. 5 is a flowchart illustrating an example of an operation of a data transfer process performed in a virtual tape library device according to the second embodiment.

Next, an operation of the virtual tape library device 5 according to this embodiment will be described. FIG. 5 is a flowchart illustrating an example of an operation of a data transfer process performed in the virtual tape library device 5 according to this embodiment. Here, a description will be given under the assumption that the hierarchical control section 11A receives a data request from the host 2. In this flowchart, the procedures denoted by the same reference numerals as those in FIG. 3 are procedures that are the same as or equivalent to those illustrated in FIG. 3. Thus, a second description of the procedures, which are the same as the previously described embodiment(s) will be omitted. In a case where it is determined in the second determining procedure S104 that the volume of the requested data is equal to or larger than the threshold (YES in S104), the determining sections and executing sections (a first reading section and a first transferring section) (a second reading section and a second transferring section) of the hierarchical control sections 11A and 11B perform an individual process (S2), and this flow ends. Stated differently, each of the hierarchical control sections 11A and 11B perform the individual process (S2). Next the individual process will be described in detail with reference to FIG. 6.

Figure 6:
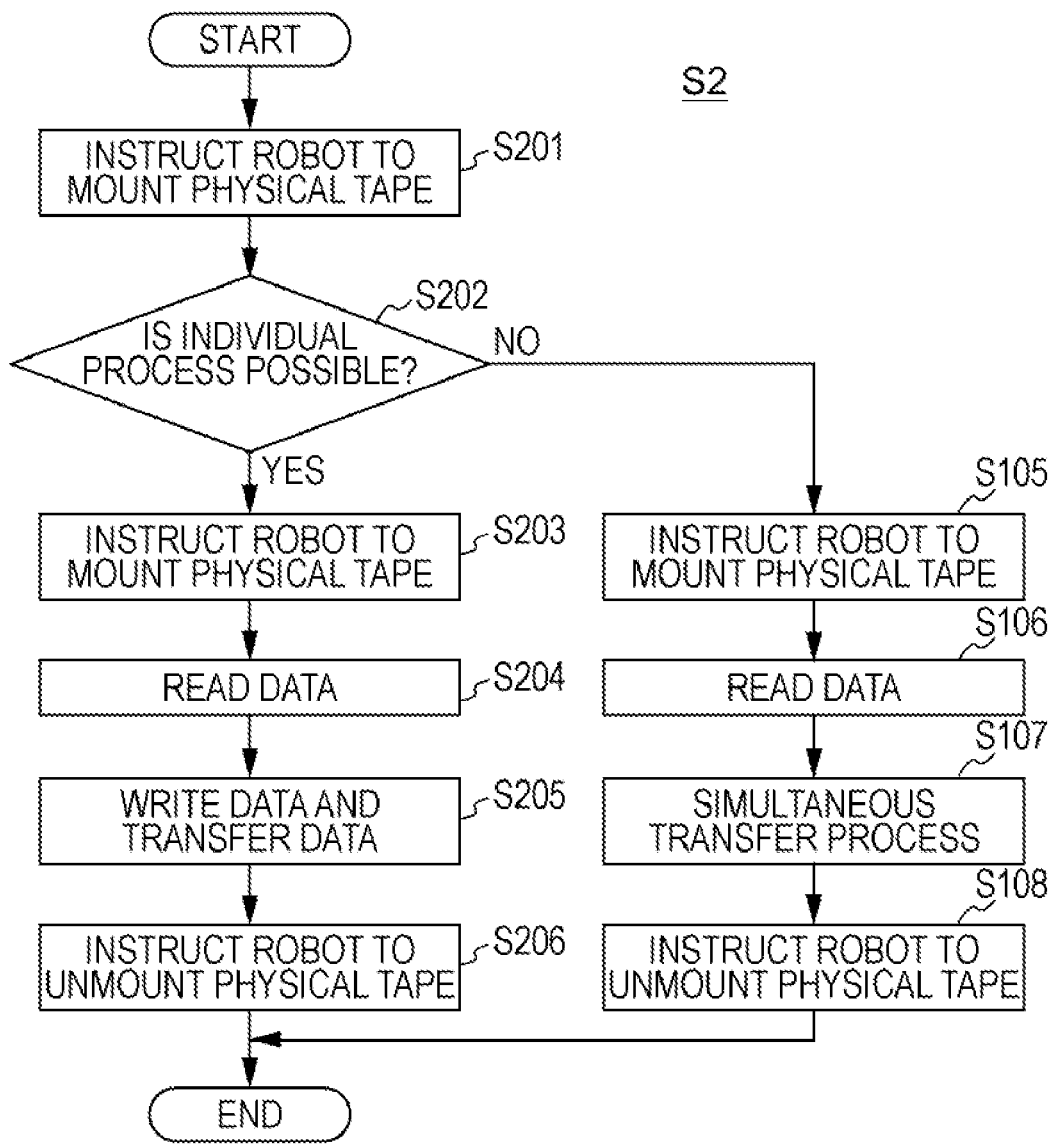
FIG. 6 is a flowchart illustrating an example of an operation of an individual process performed in the virtual tape library device according to the second embodiment.

FIG. 6 is a flowchart illustrating an example of an operation of the individual process (S2) performed in the virtual tape library device 5 according to this embodiment.

In a case where it is determined in the second determining procedure S104 that the volume of the requested data is equal to or larger than the threshold (YES in S104, the second determining procedure), the executing section 104A instructs the robot 32A to mount the physical tape 33A storing the requested data on the drive 31A that is connected to the hierarchical control section 11A (S201). In response to the instructions, the robot 32A mounts the physical tape 33A on the drive 31A. After the mounting, the respective determining sections determine whether the hierarchical control sections 11A and 11B are capable of individually performing a process (S202, a third determining procedure and a fourth determining procedure). That is, the respective determining sections determine whether the requested data is stored on at least two of the physical tapes 33A and 33B, whether there are at least two respective drives 31A and 31B on which no physical tape 33 is mounted, and whether the respective drives 31A and 31B are connected to different hierarchical control sections 11A and 11B.

In a case where the individual process is possible (YES in S202, the third determining procedure and the fourth determining procedure), the executing section 104B instructs the root 32B to mount the physical tape 33B storing the requested data on the drive 31B connected to the hierarchical control section 11B (S203). In response to the instructions, the robot 32B mounts the physical tape 33B on the drive 31B. After the mounting, the executing section of the hierarchical control section 11A starts reading the requested data from the drive 31A, and also the executing section of the hierarchical control section 11B starts reading the requested data from the drive 31B (S204, a first reading procedure and a second reading procedure).

After the reading of data has started on both sides, the executing section of the hierarchical control section 11A sequentially transfers blocks of the requested data read to the memory 112A to the host 2. At the same time as the transfer, the executing section of the hierarchical control section 11B sequentially writes the blocks of the requested data read to the memory 112B on the disk array 12 in the reading order (S205, a first transferring procedure and a second transferring procedure). After transferring the data to the host 2 and writing the data on the disk array 12, the respective executing sections of the hierarchical control sections 11A and 11B instruct the robots 32A and 32B to unmount the physical tapes 33A and 33B, respectively (S206), and this flow ends.

In a case where it is determined in the third determining procedure or the fourth determining procedure S202 that the individual process is impossible (NO in S202, the third determining procedure and the fourth determining procedure), the executing section performs the above-described procedures S105 to S108, and this flow ends.

In this embodiment, the hierarchical control section 11A that has received a request transfers data to the host 2. Alternatively, the hierarchical control section 11A may write the data on the disk array 12 and the hierarchical control section 11B may transfer the data to the host 2. Also, in this embodiment, the hierarchical control sections 11A and 11B do not necessarily perform the process simultaneously, and the hierarchical control sections 11A and 11B may individually perform processes at the time when the respective hierarchical control sections 11A and 11B are brought into a state for transferring or writing the data. Furthermore, in this embodiment, the tape libraries 3A and 3B of a dual structure are provided. However, the above-described individual process can be executed even in a case where a single tape library 3 includes the drives 31A and 31B and the physical tapes 33A and 33B.

In this embodiment, the drive 31A may be connected to each of the hierarchical control sections 11A and 11B via a hub or the like, not only to the hierarchical control section 11A. This is the same for the drive 31B. Also, in this embodiment, the individual process can be performed even in a case where the drives 31A and 31B are connected to the hierarchical control sections 11A and 11B, respectively, and where the physical tapes 33A and 33B are contained only in the tape library 3A.

According to the above-described embodiment, transfer of data to the host 2 and write of data on the disk array 12 are performed individually in the hierarchical control sections 11A and 11B, whereby the processing load of CPUs 111A and 111B of the hierarchical control sections 11A and 11B can be reduced. Also, according to this embodiment, the hierarchical control section 11A transfers data to the host 2 without writing the data on the disk array 12, thereby being capable of quickly responding to a request for reading data. Furthermore, delay in data transfer can be suppressed.

Third Embodiment

In the above-described first and second embodiments, all blocks of data requested by the host 2 are transferred. Alternatively, the virtual tape library device 1 may perform a partial transfer process of reading only some of the blocks having a high reading frequency in the requested data and transferring the read blocks to the host 2. For example, the high reading frequency means that the number of reading times in a time is large.

First, a configuration of a virtual tape library system according to this embodiment will be described. The virtual tape library system according to this embodiment is the same as that of the first embodiment except the disk array 12, the determining section 102, and the executing section 104, and thus the corresponding descriptions of the elements that are the same as the first embodiment will be omitted.

This embodiment is different from the first embodiment in that statistical information (e.g., unit information) is stored in the disk array 12. The statistical information includes, for example, the access frequency and update information with respect to the value of each block of each piece of data. In this embodiment, the access frequency indicates the number of times the corresponding block is requested by the host 2. For example, the access frequency may indicate the number of times the corresponding block is requested by the host 2 in a time period. Further, the update information may indicate a time stamp and may be updated every time the block is requested by the host 2. Also, this embodiment is different from the first embodiment in that the disk array 12 stores a data size table in which each size of requested data is associated with the percentage of blocks to be read from the tape. The data size table will be described below.

The determining section 102 according to this embodiment is different from that according to the first embodiment in that the determining section 102 further determines whether the statistical information held in the disk array 12 includes information about a block requested by the host 2 and determines the access frequency of the block. Also, the determining section 102 according to this embodiment is different from that according to the first embodiment in that the determining section 102 further determines whether the block requested by the host 2 is stored in the disk array 12. Furthermore, the executing section 104 according to this embodiment is different from that according to the first embodiment in further performing extraction of a block of requested data, an operation of selecting a block of the requested data and reading only the selected block of the requested data, and updating of the statistical information.

Figure 7:
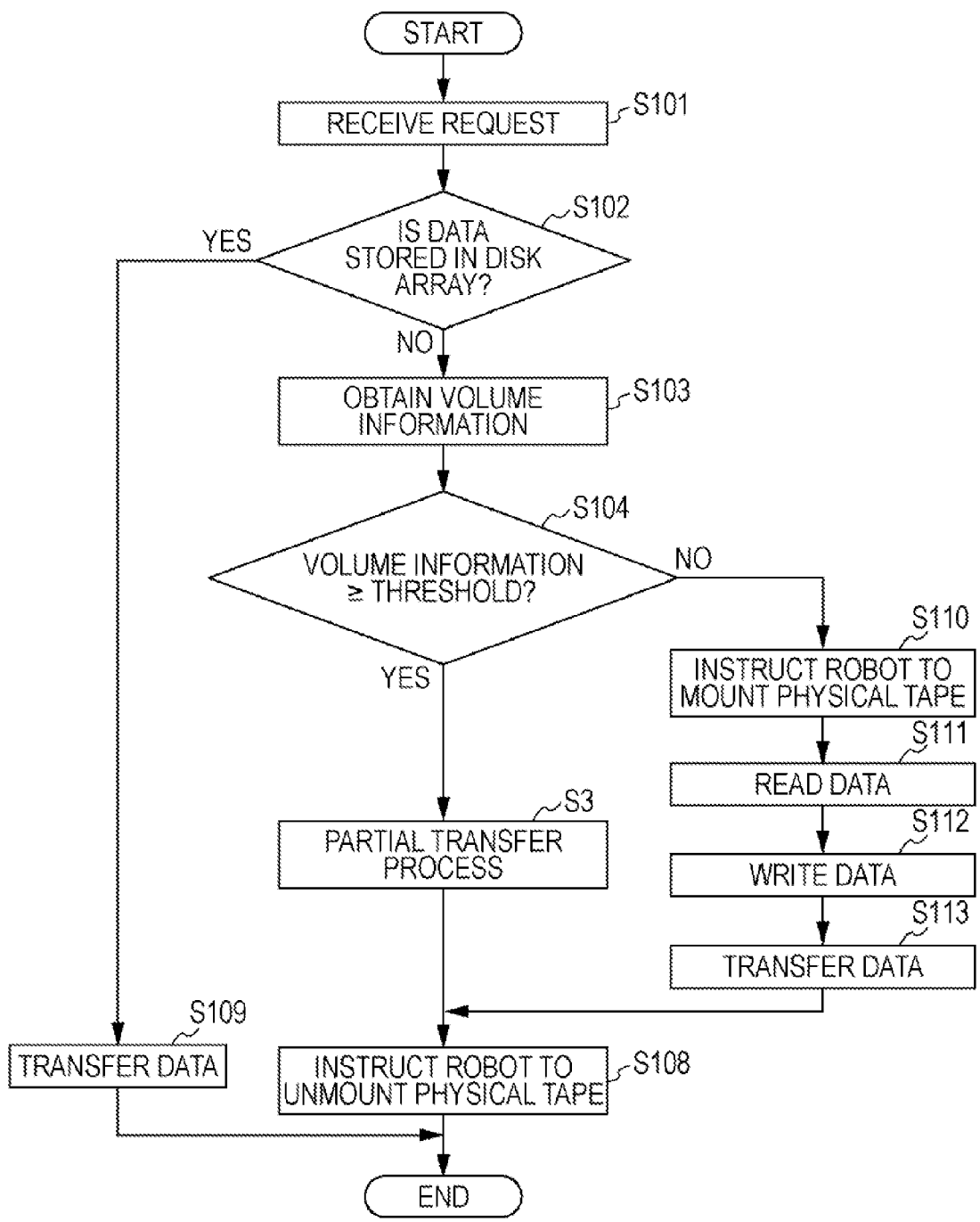
FIG. 7 is a flowchart illustrating an example of an operation of a data transfer process performed in a virtual tape library device according to a third embodiment.

Next, an operation of the virtual tape library device according to this embodiment will be described. FIG. 7 is a flowchart illustrating an example of an operation of a data transfer process performed in the virtual tape library device according to this embodiment. In FIG. 7, the procedures denoted by the same reference numerals as those in FIG. 3 are procedures that are the same as or equivalent to those in FIG. 3, and thus a second description of the procedures, which are the same as the previously described embodiment(s) is omitted. In a case where it is determined in the second determining procedure S104 that the volume of the requested data is equal to or larger than the threshold (YES in S104, the second determining procedure), the determining section 102 and the executing section 104 perform the partial transfer process described below (S3). After the partial transfer process, the executing section 104 instructs the robot 32 to unmount the physical tape 33 (S108), and this flow ends. Next, the partial transfer process will be described in detail with reference to FIG. 8.

Figure 8:
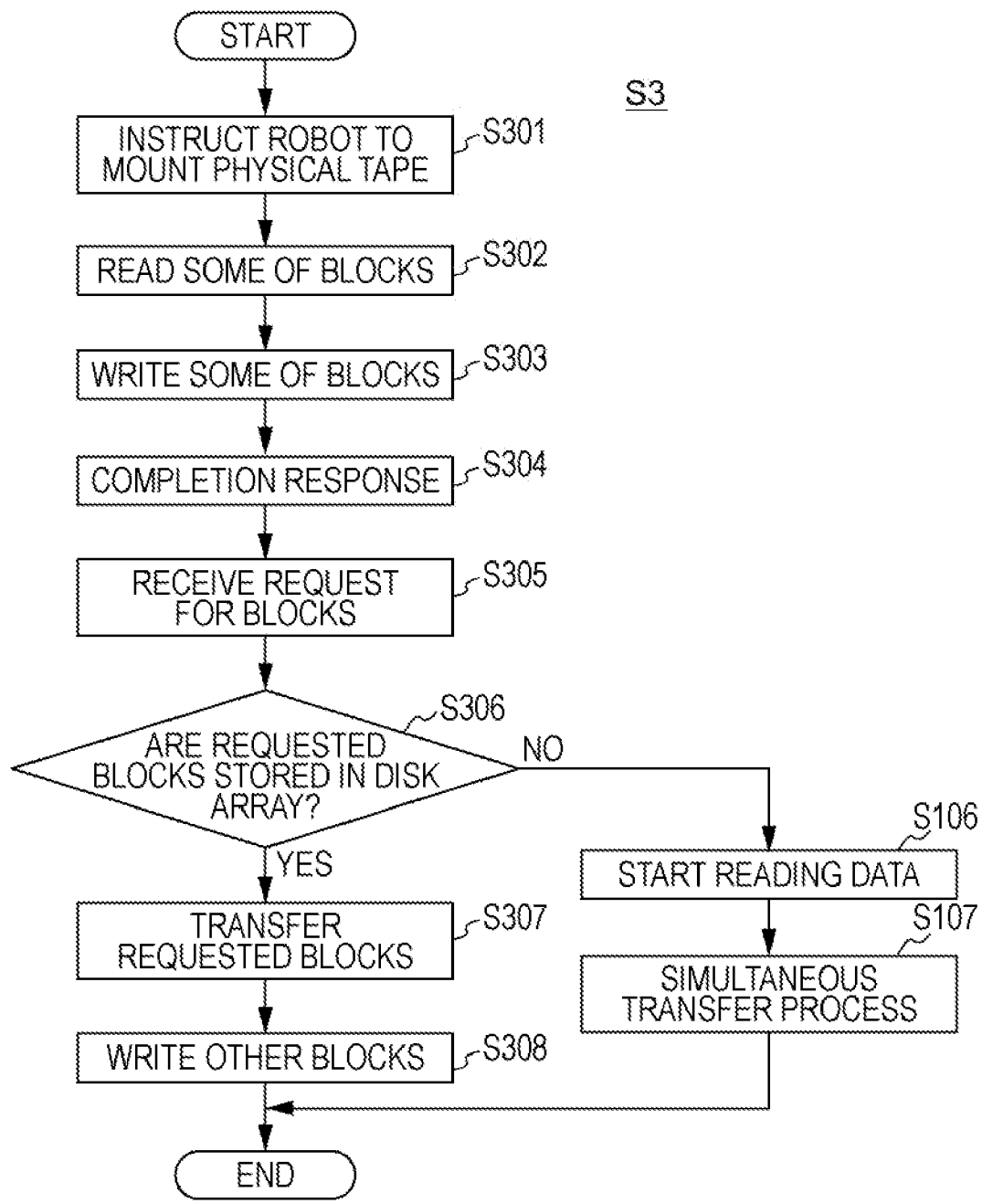
FIG. 8 is a flowchart illustrating an example of an operation of a partial transfer process performed in the virtual tape library device according to the third embodiment.
Figure 9:
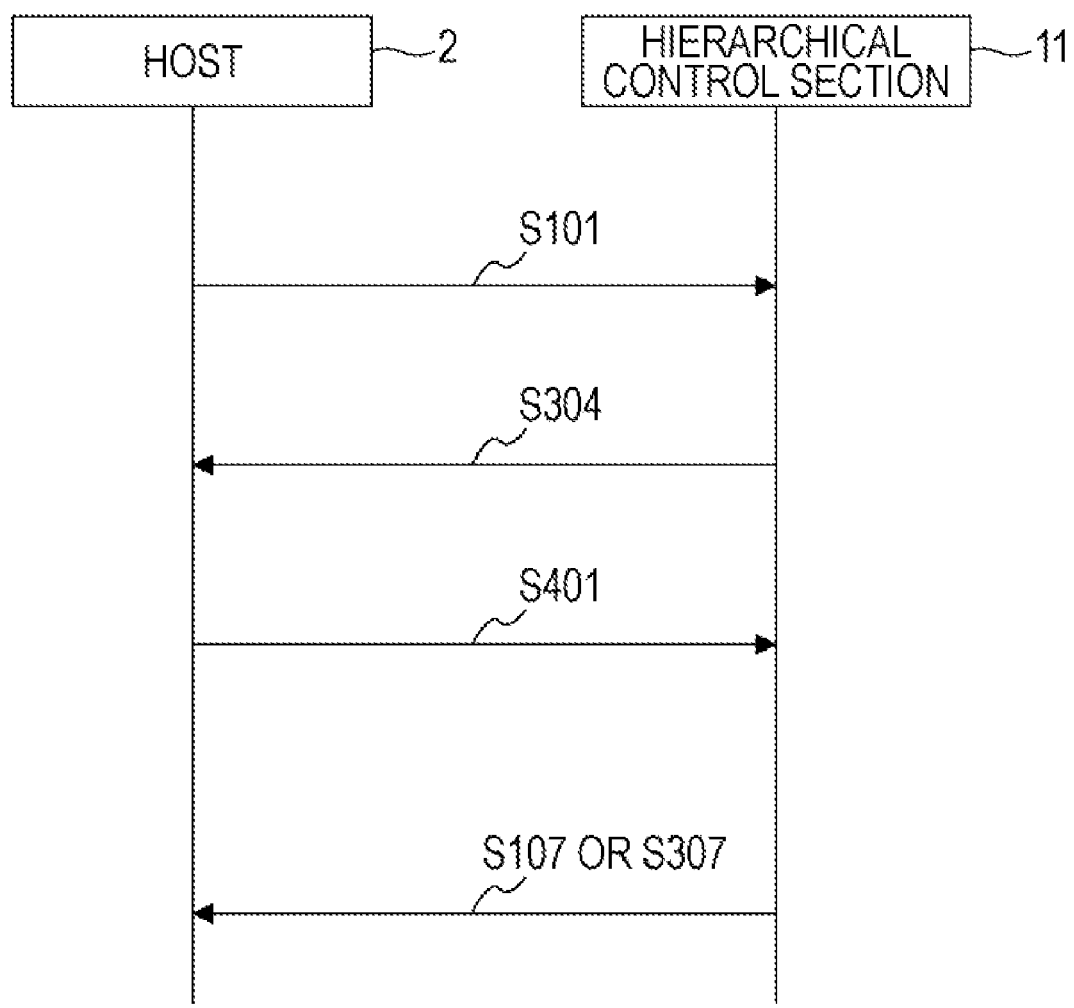
FIG. 9 illustrates a sequence of a process performed between a host and a hierarchical control section.

FIG. 8 is a flowchart illustrating an example of an operation of the partial transfer process performed in the virtual tape library device according to this embodiment. FIG. 9 illustrates a sequence of a process performed between the host 2 and the hierarchical control section 11.

First, as illustrated in FIG. 8, the executing section 104 instructs the robot 32 to mount the physical tape 33 storing the requested data on the drive 31 (S301). In response to the instructions, the robot 32 mounts the physical tape 33 on the drive 31. After the mounting, the executing section 104 starts reading some of the blocks constituting the requested data to the memory 112 (S302, a unit reading procedure), and writes the blocks of the requested data read to the memory 112 onto the disk array 12 (S303, a unit writing procedure). A selecting method and a data amount of blocks to be read will be described in detail below. After the writing, the executing section 104 transmits a completion response to notify the host 2 that writing of the data has ended (S304, a responding procedure).

In accordance with the completion response, the host 2 requests predetermined blocks to the hierarchical control section 11 (S401) as illustrated in FIG. 9, and the receiving section 101 receives the request from the host 2 (S305, a unit request receiving procedure). After the reception of the request, the determining section 102 determines whether the requested blocks are stored in the disk array 12 (S306, a unit determining procedure). In a case where the requested blocks are stored in the disk array 12 (YES in S306, the unit determining procedure), the executing section 104 transfers the blocks that are requested by the host 2 and that are stored in the disk array 12 to the host 2 (S307, a unit transfer procedure). After the transfer, the executing section 104 writes the blocks other than the blocks transferred to the host 2 onto the disk array 12 (S308), and this flow ends.

In a case where the requested blocks are not stored in the disk array 12 (NO in S306, the unit determining procedure), the executing section 104 starts reading data in S106 and performs the simultaneous transfer process in S107, and this flow ends. Next, a partial data reading process in S302 will be described in detail with reference to FIGS. 10 and 11.

Figure 10:
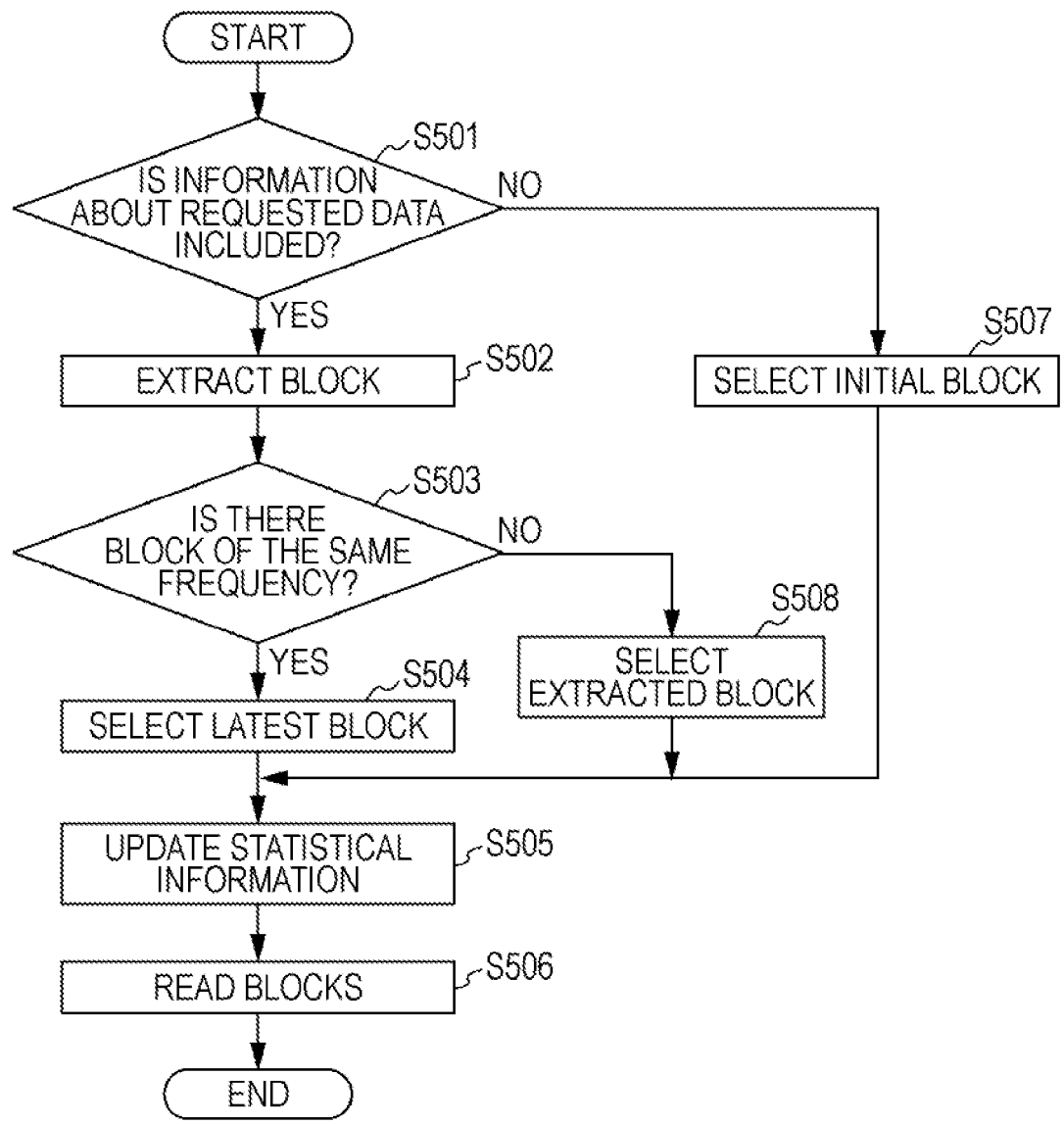
FIG. 10 is a flowchart illustrating an example of an operation of a partial data reading process performed in the virtual tape library device according to the third embodiment.

FIG. 10 is a flowchart illustrating an example of an operation of the partial data reading process performed in the virtual tape library device according to this embodiment. First, the determining section 102 determines whether the statistical information held in the disk array 12 includes information about the data requested by the host 2 (S501). In a case where the statistical information includes information about the requested data (YES in S501), the executing section 104 extracts a block of the highest access frequency on the basis of the statistical information (S502). After the extraction of the block, the determining section 102 determines whether there exists a block of the same access frequency as that of the extracted block on the basis of the statistical information (S503). In a case where there exists a block of the same access frequency as that of the extracted block (YES in S503), the executing section 104 selects a block having the latest time stamp on the basis of the statistical information (S504) and updates the statistical information (S505). After the update of the statistical information, the executing section 104 sequentially reads blocks starting from the selected block (S506), and this flow ends.

In a case where information about the requested data is not included in the statistical information (NO in S501), the executing section 104 selects the initial block of the requested data (S507), updates the statistical information (S505), and reads the blocks (S506). Then, this flow ends. In a case where there exists no block of the same access frequency as that of the extracted block (NO in S503), the executing section 104 selects the extracted block (S508), updates the statistical information (S505), and reads the blocks (S506). Then, this flow ends. In the reading of the blocks (S506), the executing section 104 determines the data size of the blocks to be read when reading the selected block. A data size determining method will be described below.

Figures 11, 12:
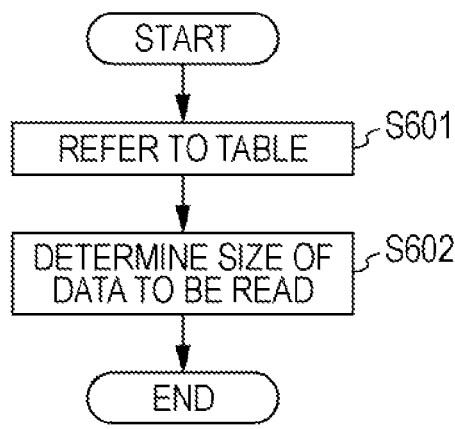
FIG. 11 illustrates an example of a data size table according to the third embodiment.
FIG. 12 is a flowchart illustrating an example of a data size determining method in the virtual tape library device according to the third embodiment.

FIG. 11 illustrates an example of the data size table according to this embodiment. FIG. 12 is a flowchart illustrating an example of the data size determining method executed in the virtual tape library device according to this embodiment. As illustrated in FIG. 11, in the data size table 7, the size as volume of the requested data is associated with the percentage of blocks to be read. With reference to the data size table 7, the executing section 104 determines the data size of the blocks to be read.

As illustrated in FIG. 12, the executing section 104 refers to the data size table 7 held in the disk array 12 (S601). After the reference, the executing section 104 determines the size of data to be read to the percentage corresponding to the size of the requested data on the basis of the data size table 7 (S602), and this flow ends. For example, in a case where the size of the requested data is 200 G, the executing section 104 determines to read 7 G, that is, 3.5% of the requested data. The executing section 104 sequentially reads blocks starting from the selected block until obtaining data of the determined data size.

In this embodiment, the determination of the above-described data size is performed in the data reading process (S506), but the determination may be performed at a time other during the reading process. Also, the data size table 7 is not limited to the above-described table, and settings can be modified.

According to this embodiment, blocks of data requested by the host 2 may be statistically managed, and blocks of the requested data may be predicted on the basis of the access frequency thereof. Accordingly, only the blocks, which are likely to be requested may be extracted, and transferred to the host 2. Accordingly, a quick response to a data reading request from the host 2 can be realized, and delay in data transfer can be suppressed.

According to the disclosed storage device and data transfer method for the storage device, data can be transferred to a host without delay in a case where large-volume data requested by the host is cache-miss data.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A storage device configured to be connected to a tape library and a host device, the tape library including a plurality of tapes holding data, the storage device comprising:
   a memory that stores data read from the tapes to transfer the read data to the host device and a storage section;
   a receiving section to receive a request for data held in one of the tapes from the host device;
   a first determining section to determine whether the requested data is stored in the storage section on a basis of the request received by the receiving section;
   a reading section to read the requested data in a predetermined amount from the tape holding the requested data and provide the read data to the memory in a case where the first determining section determines that the requested data is not stored in the storage section, the reading section includes a first reading section and a second reading section in a dual structure;
   a transferring section to transfer, to the host device, the read data provided to the memory by the reading section while writing, on the storage section, the read data provided to the memory by the reading section, the transferring section includes a first transferring section and a second transferring section in a dual structure;
   a second determining section to determine whether the requested data is held in each of the plurality of tapes; and
   a third determining section to determine whether the first reading section and the second reading section satisfy a condition of being able to read the requested data from different tapes of the plurality of tapes;

wherein, in a case where the second determining section determines that the requested data is held in the plurality of tapes and where the third determining section determines that the first reading section and the second reading section satisfy the condition of being able to read the requested data from the different tapes, the first reading section and the second reading section read the requested data in the predetermined amount from the different tapes holding the requested data, and wherein the first transferring section writes the requested data read by the first reading section on the storage section, and the second transferring section transfers the requested data read by the second reading section to the host device.

2. The storage device according to claim 1, further comprising:

a volume information obtaining section to obtain volume information indicating a volume of the requested data from the host device in a case where the first determining section determines that the requested data is not stored in the storage section; and a fourth determining section to determine whether the volume information obtained by the volume information obtaining section is equal to or larger than a threshold, wherein in a case where the fourth determining section determines that the volume information is equal to or larger than the threshold, the reading section reads the requested data in the predetermined amount to the memory from the tape and provides the read data to the memory.

3. The storage device according to claim 1, further comprising:

a plurality of drives that read data from the plurality of tapes and write the data on the plurality of tapes in the tape library, wherein the first reading section and the second reading section are connected to different ones of the plurality of drives, and the third determining section determines whether the drives are able to read the requested data from the plurality of tapes.

4. A storage device configured to be connected to a tape library and a host device, the tape library including a plurality of tapes holding data, the storage device comprising:

a storage section;

a memory that stores data read from the tapes to transfer the read data to the storage section;

a receiving section to receive a first request for first data held in one of the tapes from the host device;

a first determining section to determine whether the requested first data is stored in the storage section on a basis of the request received by the receiving section;

a reading section to read second data in a predetermined amount from the tape holding the requested first data and provide the read second data to the memory in a case where the first determining section determines that the requested first data is not stored in the storage section, the reading section includes a first reading section and a second reading section in a dual structure;

a writing section to write the read second data provided to the memory in the storage section; and a transferring section to transfer, to the host device, the read second data written in the storage section by the writing section, the transferring section includes a first transferring section and a second transferring section in a dual structure;

a second determining section to determine whether the requested first data is held in each of the plurality of tapes; and a third determining section to determine whether the first reading section and the second reading section satisfy a condition of being able to read the requested first data from different tapes of the plurality of tapes;

wherein, in a case where the second determining section determines that the requested first data is held in the plurality of tapes and where the third determining section determines that the first reading section and the second reading section satisfy the condition of being able to read the requested first data from the different tapes, the first reading section and the second reading section read the requested first data in the predetermined amount from the different tapes holding the requested first data, and wherein the first transferring section writes the requested first data read by the first reading section on the storage section, and the second transferring section transfers the requested first data read by the second reading section to the host device.

5. The storage device according to claim 4, wherein the read second data is only a part of the first data.

6. The storage device according to claim 5, further comprising:

a responding section to transmit, to the host device, a completion response indicating completion of the writing on a basis of the writing on the storage section by the writing section;

a request receiving section to receive a second request for data, the second request being transmitted in accordance with the completion response from the responding section; and a fourth determining section to determine whether the requested first data is included in the read second data on a basis of the request received by the request receiving section, wherein, in a case where the fourth determining section determines that the requested first data is included in the read second data, the transferring section transfers the read second data to the host device.

7. The storage device according to claim 5, further comprising:

a volume information obtaining section to obtain volume information indicating a volume of the requested first data from the host device in a case where the first determining section determines that the requested first data is not stored in the storage section; and a fourth determining section to determine whether the volume information obtained by the volume information obtaining section is equal to or larger than a threshold, wherein, in a case where the fourth determining section determines that the volume information is equal to or larger than the threshold, the reading section reads the second data, which is only a part of the first requested data, in the predetermined amount from the tape holding the first requested data.

8. The storage device according to claim 7, wherein the storage section holds a table in which a volume of the first requested data is associated with a percentage of data read from the tape and holds unit information which is information about past data requested by the host device, and wherein the reading section selects the second data on a basis of the unit information and reads the selected second data and data after the selected part in accordance with the percentage based on the table.

9. The storage device according to claim 8, wherein the unit information includes an access frequency and a time stamp of the past data.

10. The storage device according to claim 1, wherein the data is in units of data blocks.

11. A data transfer method for a storage device configured to be connected to a tape library and a host device, the tape library including a plurality of tapes holding data, the method comprising:

receiving a request for data held in one of the tapes from the host device;

first determining whether the requested data is stored in a storage section on a basis of the received request;

reading the requested data in a predetermined amount from the tape holding the requested data and providing the read data to a memory to transfer the read data to the host and the storage section in a case where the first determining determines that the requested data is not stored in the storage section, the reading includes a first reading procedure and a second reading procedure; and transferring, to the host device, the read data provided to the memory while writing, on the storage section, the read data provided to the memory, the transferring includes a first transferring procedure and a second transferring procedure;

second determining whether the requested data is held in each of the plurality of tapes; and third determining whether the first reading procedure and the second reading procedure satisfy a condition of being able to read the requested data from different tapes of the plurality of tapes;

wherein, in a case where the second determining determines that the requested data is held in the plurality of tapes and where the third determining determines that the first reading procedure and the second reading procedure satisfy the condition of being able to read the requested data from the different tapes, the first reading procedure and the second reading procedure read the requested data in the predetermined amount from the different tapes holding the requested data, and wherein the first transferring procedure writes the requested data read by the first reading procedure on the storage section, and the second transferring procedure transfers the requested data read by the second reading procedure to the host device.

12. The method according to claim 11, further comprising:

obtaining volume information indicating a volume of the requested data from the host device in a case where the first determining determines that the requested data is not stored in the storage section; and fourth determining whether the volume information obtained in the obtaining is equal to or larger than a threshold, wherein, in a case where the fourth determining determines that the volume information is equal to or larger than the threshold, the reading reads the requested data in the predetermined amount to the memory from the tape holding the requested data.

13. The method according to claim 11, wherein the third determining determines whether the tape library includes a plurality of drives to read the data held in the plurality of tapes and write the data on the tapes, and whether the first reading procedure and the second reading procedure are capable of reading the requested data from the plurality of tapes by using the plurality of drives.

* * * * *